United States Patent [11] 3,575,067

[72] Inventor Stanley W. Herman
 Indianapolis, Ind.
[21] Appl. No. 866,915
[22] Filed Oct. 16, 1969
[45] Patented Apr. 13, 1971
[73] Assignee General Motors Corporation
 Detroit, Mich.

[54] TRANSMISSION
 3 Claims, 1 Drawing Fig.
[52] U.S. Cl. ................................................ 74/759
[51] Int. Cl. ........................................... F16h 57/10
[50] Field of Search ..................................... 74/759

[56] References Cited
 UNITED STATES PATENTS
 3,282,131  11/1966  Smith ......................... 74/759X
 3,398,606   8/1968  Utter .......................... 74/759

*Primary Examiner*—Arthur T. McKeon
*Attorneys*—W. E. Finken, A. M. Heiter and R. L. Phillips ABSTRACT: A vehicular transmission having two planetary gear sets, three brakes and three clutches combined to provide three forward speed range drives and one reverse speed range drive with an extremely high-speed reduction ratio in the lowest forward speed range drive.

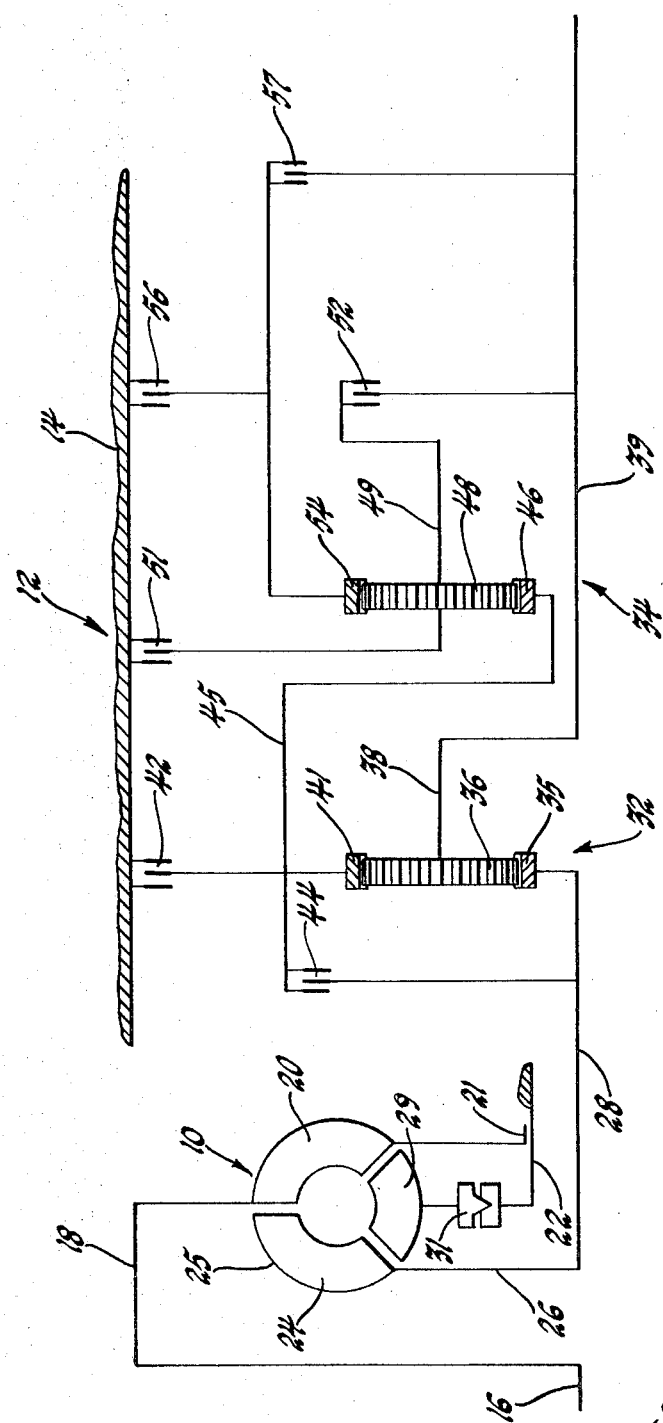
INVENTOR.
Stanley W. Herman
BY
Ronald L. Phillips
ATTORNEY

TRANSMISSION

This invention relates to transmissions and more particularly to multiratio vehicular transmissions of the planetary-gearing type.

In earthmoving vehicles of the loader-type, for example, it is desirable to have a transmission providing several forward speed range drives for working, another forward drive for rapid traveling and also a reverse drive for working. In transmissions of this type it is particularly desirable that the transmission provide a low-speed reduction ratio for use in driving the vehicle forwardly to the load and an extremely high-speed reduction ratio for use in driving the vehicle to engage the load. It is also desirable that the transmission provide a high-speed reduction ratio for use in driving the vehicle in reverse to retreat with the load which would then be normally followed by use of the low-speed reduction ratio for use in driving the vehicle forwardly to deposit the load. It is further desirable that the transmission provide a direct drive for use in driving the vehicle forwardly for rapid overland traveling. Though there are conventional transmissions capable of providing such speed ratio coverage, such transmissions generally have complex gearing arrangements.

The preferred embodiment of the transmission according to the present invention has a simple gearing arrangement comprising a pair of planetary gear sets receiving input power via a hydrodynamic torque converter. There is a brake and a clutch associated with one gear set and two brakes and two clutches associated with the other gear set. These gear sets, brakes and clutches, are combined to provide three forward speed range drives and a reverse speed range drive. The lowest forward drive is obtained by compound action of the two gear sets, the intermediate forward drive is obtained by using only one of the gear sets and the highest forward drive is obtained by locking up the latter gear set. The reverse drive is also obtained by compound action of the two gear sets.

An object of the present invention is to provide a new and improved transmission.

Another object is to provide a transmission having two planetary gear sets combined to provide compound action to effect an extremely high-speed reduction forward drive and a lower speed reduction reverse drive.

Another object is to provide a transmission having only two planetary gear sets and six drive-establishing devices combined to provide three forward speed range drives and a reverse speed range drive.

Another object is to provide a transmission having two gear sets, three clutches and three brakes combined to provide three forward speed range drives and a reverse speed range drive with the lowest forward drive having an extremely high-speed reduction ratio.

These and other objects of the invention will be more apparent from the following description and drawing of the preferred embodiment of the invention.

The drawing diagrammatically shows the preferred embodiment of the transmission according to the present invention.

Referring to the drawing, the preferred embodiment of the transmission generally comprises a hydrodynamic torque converter 10 and a planetary-type range gearing 12 housed in a transmission housing generally designated as 14. This range gearing which receives all input power via the torque converter is operable to provide three forward speed range drives and a reverse speed range drive with the lowest forward speed range drive having an extremely high-speed reduction ration.

An input shaft 16 which is adapted to be driven by the vehicle's engine is connected to drive housing 18 of the hydrodynamic torque converter. Housing 18 has a rear curved portion to which the converter's pump blades 20 are attached and also has a hub 21 which may be supported on a ground sleeve 22 secured to the transmission housing 14. The pump blades 20 deliver circulating fluid in the counterclockwise direction to turbine blades 24 which are attached to a cover 25 having a hub 26 which is connected to the converter's output shaft 28. As fluid leaves turbine blades 24 it is redirected to pump blades 20 by stator blades 29 which are connectable by a one-way brake 31 to ground sleeve 22. The converter, being a three element converter of conventional design, provides torque multiplication in the conventional manner up to coupling speed and provides substantially 1:1 speed ratio drive thereafter.

The converter's output shaft 28 transmits power to the range gearing 12 which includes only two planetary gear sets 32 and 34. The converter's output shaft 28 which may also be called the input shaft for the range gearing is connected to sun gear 35 of gear set 32. In gear set 32, pinions 36 mesh with sun gear 35 and are carried by a carrier 38 which is connected to the transmission's output shaft 39. Pinions 36 also mesh with ring gear 41 which may be either held by engagement of a brake 42 or connected to the converter's output shaft 28 by engagement of a clutch 44. The ring gear 41 of gear set 32 is connected by a drum 45 to sun gear 46 of gear set 34. In gear set 34, sun gear 46 meshes with pinions 48 which are carried on a carrier 49. Carrier 49 may be either held by engagement of a brake 51 or connected to output shaft 39 by engagement of a clutch 52. Pinions 48 also mesh with a ring gear 54 which may be either held by engagement of a brake 56 or connected to output shaft 39 by engagement of a clutch 57.

The brakes and clutches or drive-establishing devices employed in the transmission may be of any suitable conventional type and may be actuated in any known way, e.g. electrically, hydraulically, pneumatically or by some mechanical provision and according to a certain sequence.

Describing now the operation of the transmission, the first forward speed range drive which has the highest speed reduction ratio is established when brake 51 and clutch 57 are engaged and all other drive-establishing devices are disengaged. Assuming there is engine power to input shaft 16 so that converter 10 powers the converter's output shaft 28 in what will be described as the forward direction, the thus forwardly driven sun gear 35 transmits torque to drum 45 through pinions 36 which are caused to orbit in ring gear 41. With the carrier 38 connected to output shaft 39, the torque on drum 45 causes the drum and thus ring gear 41 and sum gear 46 to rotate in the reverse direction. With carrier 49 of gear set 34 held, pinions 48 are driven about their axes by sun gear 46 and drive the ring gear 54 and the output shaft 39 clutched thereto in the forward direction and at a reduced speed. Thus, output shaft 39 is driven in the same direction as the converter's output shaft 28 and at a reduced speed by the thus compounded action of gear sets 32 and 34 to provide the first or lowest forward speed range drive.

The second or intermediate forward speed range drive is established by engaging brake 42 and disengaging all other drive-establishing devices. With ring gear 41 held, the forwardly rotating sun gear 35 causes pinions 36 to orbit in ring gear 41 and drive carrier 38 and connected output shaft 39 in the forward direction and at a reduced speed relative to sun gear 35 and connected shaft 28.

The third or highest forward speed range drive is established by engaging clutch 44 and disengaging all other drive-establishing devices. This locks up gear set 32 so that there is provided a 1:1 speed ratio drive between shafts 28 and 39.

The reverse speed range drive is established by engaging brake 56 and clutch 52 and disengaging all other drive establishing devices. The forwardly rotating sun gear 35 transmits torque to drum 45 through pinions 36 which are caused to orbit in ring gear 41. The torque on drum 45 causes the drum and thus ring gear 41 and sun gear 46 to rotate in the reverse direction like in the first forward speed range drive. Since ring gear 54 is now held, the backwardly driven sun gear 46 causes pinions 48 to orbit in ring gear 54 and drive the carrier 49 and the output shaft 39 clutched thereto in the reverse direction and at a reduced speed. Thus, output shaft 39 is driven in the opposite direction as the converter's output shaft 28 and at a reduced speed by the thus compounded action of gear sets 32 and 34 to provide the reverse speed range drive.

Preferably, the ring gears of the two gear sets have the same size but the sun gears of these gear sets may be of different size. To illustrate a typical set of speed ratios that are available from this simple gearing arrangement, it will be assumed that the ring gears 41 and 54 each have 62 teeth, the sun gear 35 has 22 teeth and the sun gear 46 has 30 teeth. With these gear sizes, the speed ratio for the first forward speed range drive is 9.65:1 which is extremely high speed reduction ratio, that for the second forward speed range drive is 3.82:1, that for the third speed range forward drive is 1:1, and that for the reverse speed range drive is 5.09:1.

The above-described preferred embodiment is illustrative of the invention which may be modified within the scope of the appended claims.

I claim:

1. In a transmission the combination of an input shaft; an output shaft; a pair of planetary gear sets each comprising a sun gear, a ring gear, and a carrier having a pinion meshing with both said sun gear and said ring gear; said input shaft being connected to the sun gear of one of said gear sets; the carrier of said one gear set being connected to said output shaft; the ring gear of said one gear set being connected to the sun gear of the other of said gear sets; first clutch means or selectively drivingly connecting the ring gear of said other gear set to said output shaft; first brake means for selectively braking the carrier of said other gear set whereby on simultaneous engagement of said first clutch means and said first brake means there is effected a drive causing said output shaft to rotate in the same direction as said input shaft and at a reduced speed; second clutch means for selectively drivingly connecting the carrier of said other gear set to said output shaft; and second brake means for selectively braking the ring gear of said other gear set whereby on simultaneous engagement of said second clutch means and said second brake means there is effected a drive causing said output shaft to rotate in the opposite direction as said input shaft and at a reduced speed.

2. The transmission set forth in claim 1 and third brake means for selectively braking the ring gear of said one gear set whereby on engagement of only said third brake means there is effected a drive causing said output shaft to rotate in the same direction as said input shaft and at a reduced speed.

3. The transmission set forth in claim 2 and third clutch means for selectively locking up said one gear set whereby on engagement of only said third clutch means there is effected a direct drive between said input shaft and said output shaft.